United States Patent
Ballard

(10) Patent No.: US 7,786,052 B2
(45) Date of Patent: Aug. 31, 2010

(54) HYDROPHOBICALLY MODIFIED FLUID LOSS ADDITIVES AND VISCOSIFIER PRODUCTS

(75) Inventor: David Antony Ballard, Aberdeenshire (GB)

(73) Assignee: M-I L.L.C., Houston, TX (US)

( * ) Notice: Subject to any disclaimer, the term of this patent is extended or adjusted under 35 U.S.C. 154(b) by 496 days.

(21) Appl. No.: 11/760,543

(22) Filed: Jun. 8, 2007

(65) Prior Publication Data

US 2007/0287640 A1    Dec. 13, 2007

Related U.S. Application Data

(60) Provisional application No. 60/804,354, filed on Jun. 9, 2006.

(51) Int. Cl.
*C09K 8/60* (2006.01)
*E21B 21/00* (2006.01)
*C09K 8/24* (2006.01)

(52) U.S. Cl. .................. 507/219; 507/117; 507/106

(58) Field of Classification Search .......... 507/219, 507/217, 117, 106
See application file for complete search history.

(56) References Cited

U.S. PATENT DOCUMENTS

| | | | |
|---|---|---|---|
| 2,531,502 A * | 11/1950 | De Groote | ............ 562/475 |
| 4,425,462 A | 1/1984 | Turner et al. | |
| 4,435,529 A * | 3/1984 | Kaylo et al. | ............ 523/426 |
| 4,442,241 A | 4/1984 | Drake et al. | |
| 5,128,390 A | 7/1992 | Murphey et al. | |
| 5,945,386 A | 8/1999 | Alonso-DeBolt et al. | |
| 6,194,490 B1 | 2/2001 | Roth et al. | |
| 6,790,811 B2 | 9/2004 | Patel | |
| 2004/0050752 A1 | 3/2004 | Leinweber et al. | |
| 2005/0020735 A1 | 1/2005 | Krappe et al. | |
| 2005/0288456 A1 | 12/2005 | Morkunas et al. | |

FOREIGN PATENT DOCUMENTS

WO    02/053676 A1    7/2002

OTHER PUBLICATIONS

PCT International Search Report issued in Application No. PCT/US2007/070860 dated Sep. 27, 2007 (3 pages).
PCT Written Opinion issued in Application No. PCT/US2007/070860 dated Sep. 27, 2007 (5 pages).
Office Action issued in Canadian Application No. 2,654,591 dated Jun. 10, 2010 (2 pages).
Extended European Search Report issued in European Application No. 07870160.4 dated Jun. 16, 2010 (7 pages).

* cited by examiner

*Primary Examiner*—Timothy J. Kugel
*Assistant Examiner*—Atnaf Admasu
(74) *Attorney, Agent, or Firm*—Osha • Liang LLP

(57) ABSTRACT

A wellbore fluid that includes an oleaginous continuous phase; a non-oleaginous phase; and a polymeric additive formed by reaction of at least one lipophilic epoxy modifier and at least one epoxide-reactive agent, wherein the at least one epoxide-reactive agent comprises at least one selected from lignins, tannins, biopolymers, starches, carboxy methyl cellulose, polyacrylates, polyacrylamides, and synthetic polymers is disclosed.

21 Claims, No Drawings

HYDROPHOBICALLY MODIFIED FLUID LOSS ADDITIVES AND VISCOSIFIER PRODUCTS

CROSS-REFERENCE TO RELATED APPLICATIONS

This application claims priority under 35 U.S.C. §119(e) to U.S. Provisional Patent Application No. 60/804,354, filed Jun. 9, 2006, the disclosure of which is incorporated herein by reference.

BACKGROUND OF INVENTION

1. Field of the Invention

Embodiments disclosed herein relate generally to components of wellbore fluids.

2. Background Art

When drilling or completing wells in earth formations, various fluids are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

Many types of fluids have been used in well bores particularly in connection with the drilling of oil and gas wells. The selection of an oil-based wellbore fluid involves a careful balance of the both the good and bad characteristics of such fluids in a particular application. The primary benefits of selecting an oil-based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art. An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based muds are used. In contrast oil-based muds provide a thin, slick filter cake which helps to prevent pipe sticking and thus the use of the oil-based mud can be justified.

Despite the many benefits of using oil-based muds, they have disadvantages. In general, the use of oil-based drilling fluids and muds has high initial and operational costs. These costs can be significant depending on the depth of the hole to be drilled. However, often the higher costs can be justified if the oil-based drilling fluid prevents the caving in or hole enlargement which can greatly increase drilling time and costs.

In general, drilling fluids should be pumpable under pressure down through strings of the drilling pipe, then through and around the drilling bit head deep in the earth, and then returned back to the earth surface through an annulus between the outside of the drill stem and the hole wall or casing. Beyond providing drilling lubrication and efficiency, and retarding wear, drilling fluids should suspend and transport solid particles to the surface for screening out and disposal. In addition, the fluids should be capable of suspending additive weighting agents (to increase specific gravity of the mud), generally finely ground barites (barium sulfate ore), and transport clay and other substances capable of adhering to and coating the borehole surface.

Drilling fluids are generally characterized as thixotropic fluid systems. That is, they exhibit low viscosity when sheared, such as when in circulation (as occurs during pumping or contact with the moving drilling bit). However, when the shearing action is halted, the fluid should be capable of suspending the solids it contains to prevent gravity separation. In addition, when the drilling fluid is under shear conditions and a free-flowing near-liquid, it must retain a sufficiently high enough viscosity to carry all unwanted particulate matter from the bottom of the well bore to the surface. The drilling fluid formulation should also allow the cuttings and other unwanted particulate material to be removed or otherwise settle out from the liquid fraction.

There is an increasing need for drilling fluids having the rheological profiles that enable these wells to be drilled more easily. Drilling fluids having tailored rheological properties ensure that cuttings are removed from the wellbore as efficiently and effectively as possible to avoid the formation of cuttings beds in the well which can cause the drill string to become stuck, among other issues. There is also the need from a drilling fluid hydraulics perspective (equivalent circulating density) to reduce the pressures required to circulate the fluid, this helps to avoid exposing the formation to excessive forces that can fracture the formation causing the fluid, and possibly the well, to be lost. In addition, an enhanced profile is necessary to prevent settlement or sag of the weighting agent in the fluid, if this occurs it can lead to an uneven density profile within the circulating fluid system which can result in well control (gas/fluid influx) and wellbore stability problems (caving/fractures).

To obtain the fluid characteristics required to meet these challenges the fluid must be easy to pump, so it requires the minimum amount of pressure to force it through restrictions in the circulating fluid system, such as bit nozzles or downhole tools. Or in other words the fluid must have the lowest possible viscosity under high shear conditions. Conversely, in zones of the well where the area for fluid flow is large and the velocity of the fluid is slow or where there are low shear conditions, the viscosity of the fluid needs to be as high as possible in order to suspend and transport the drilled cuttings. This also applies to the periods when the fluid is left static in the hole, where both cuttings and weighting materials need to be kept suspended to prevent settlement. However, it should also be noted that the viscosity of the fluid should not continue to increase under static conditions to unacceptable levels otherwise when the fluid needs to be circulated again this can lead to excessive pressures that can fracture the formation or alternatively it can lead to lost time if the force required to regain a fully circulating fluid system is beyond the limits of the pumps.

Basic invert emulsion fluid chemistry has not radically changed since its introduction; the same basic types of surfactants (amido-amines) and viscosifiers (organoclays) are still used with their associated issues. For example, the strongly wetting nature of amido-amine can cause the system to become over-dispersed, which results in a loss of viscosity.

The materials that affect the rheological profile of oil-based muds may include both viscosifiers and fluid loss additives (lost circulation materials, LCM). Accordingly, there exists a continuing need for improving these drilling materials and wellbore fluid formulations.

SUMMARY OF INVENTION

In one aspect, embodiments disclosed herein relate to a wellbore fluid that includes an oleaginous continuous phase; a non-oleaginous phase; and a polymeric additive formed by reaction of at least one lipophilic epoxy modifier and at least one epoxide-reactive agent, wherein the at least one epoxide-reactive agent comprises at least one selected from lignins, tannins, biopolymers, starches, carboxy methyl cellulose, polyacrylates, polyacrylamides, and synthetic polymers.

In another aspect, embodiments disclosed herein relate to a method of drilling a subterranean hole with an invert emulsion drilling fluid that includes mixing an oleaginous fluid, a non-oleaginous fluid, and a polymeric additive; wherein the polymeric additive is formed by mixing at least one lipophilic epoxy modifier and at least one epoxide-reactive agent; and wherein the at least one epoxide-reactive agent comprises at least one selected from lignins, tannins, biopolymers, starches, carboxy methyl cellulose, polyacrylates, polyacrylamides, and synthetic polymers; and drilling said subterranean hole using said invert emulsion as the drilling fluid.

In yet another aspect, embodiments disclosed herein relate to a wellbore fluid additive that includes a polymer formed by reaction of at least one lipophilic epoxy modifier and at least one epoxide-reactive agent; wherein the at least one epoxide-reactive agent is at least one selected from lignins, tannins, biopolymers, starches, carboxy methyl cellulose, polyacrylates, polyacrylamides, and synthetic polymers.

Other aspects and advantages of the invention will be apparent from the following description and the appended claims.

DETAILED DESCRIPTION

Embodiments of the invention relate to fluid loss additives (loss circulation materials, LCM) and viscosifiers in wellbore fluid mud formulations. In particular, some embodiments disclosed herein relate to polymeric additives synthesized via nucleophilic epoxide-opening of epoxidized lipophiles. These polymeric additives may be formed via crosslinking and/or chemical modification of an existing polymeric structure. In the following description, numerous details are set forth to provide an understanding of the present invention. However, it will be understood by those skilled in the art that the present invention may be practiced without these details and that numerous variations or modifications from the described embodiments may be possible.

In one embodiment, the polymeric additive may be formed by the reaction of a lipophilic epoxy modifier and an epoxide reactive agent. In one embodiment, the resultant polymeric additive may be a viscous liquid that may be used as a viscosifier. In another embodiment, the resultant polymeric additive may be a gel or other construct suitable as a lost circulation material.

Lipophilic Epoxy Modifier

In one embodiment, the polymeric additives may be formed by modifying/crosslinking a polymeric structure with a lipophilic epoxy modifier. As used herein, "lipophilic epoxy modifier" refers to any epoxide-containing chemical species having an affinity for oil. A lipophilic epoxy modifier containing an epoxide group may serve as the reactive electrophilic group for reaction/crosslinking with an appropriate nucleophile according to the general chemical reaction:

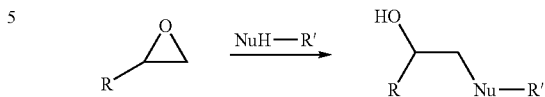

wherein R represents a lipophilic group and may comprise a plurality of epoxide groups for reaction/crosslinking, and R'NuH represents a epoxide reactive agent and may comprise a plurality of heteroatom nucleophiles.

In a particular embodiment, a suitable lipophilic epoxy modifier may include those compounds represented by the following skeletal structure:

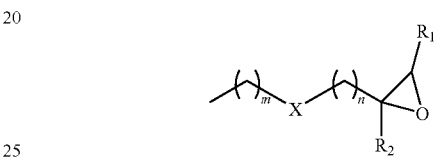

wherein X may be S, NH, O, or $CH_2$; n may range from 0 to 20; m may range from 0 to 20; and $R_1$ and $R_2$ may each be independently selected from H and alkyl groups having 1 to 4 carbon atoms. One of ordinary skill in the art would recognize that any atom along the skeletal chain shown above (including X) may be substituted and may comprise derivatives with at least one of halogen, alkoxy, aryl, and heteroaryl substituents, for example, each of which may be also be substituted. Additionally, one of skill in the art would recognize that as $R_1$ and $R_2$ increase in size, the compound's reactivity in the reaction shown above may decrease.

Suitable lipophilic epoxy modifiers may include, for example, 1,2 epoxy alkanes, such as those available under the trade name Vikolox® Epoxidized Alpha Olefins from Arkema, Inc. (Philadelphia, Pa.); long-chain alkyl ethers, including C6-C15 alkyl glycidyl ethers such those available under the trade names Epodil® 747 and Epodil® 748, available from Air Products (Allentown, Pa.), as well as other monoepoxy compounds such as a lauryl alcohol glycidyl ether available under the trade name DENACOL® EX-171 and a glycidyl ether of a mixture of C11-15 alcohol available under the trade name DENACOL® EX-192, both of which are available from Nagase ChemteX Corp. (Osaka, Japan).

In another particular embodiment, suitable lipophilic epoxy modifiers may comprise various epoxidized natural oils such as soybean oil, linseed oil, rapeseed oil, cashew nut shell oil, perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, and tall oil.

In a particular embodiment, the lipophlic monomer may comprise epoxide-containing derivatives of cardanol, which is represented by the following structure:

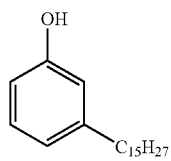

Cardanol is a meta substituted alkenyl phenol derived from naturally occurring phenols extracted from cashew nut shell liquid, derivatives of which are available from several commercial sources including Cardolite Corporation (Newark, N.J.). Due to the mixed aliphatic/aromatic structure of cardanol, its derivatives are compatible with a wide array of organic solvents, including OBM. The aliphatic side chain contains a single unsaturation which may be epoxidized and thus provides a point for possible crosslinking. Cardanol also possesses many chemical characteristics of phenols, namely reactive ortho and para positions for electrophilic aromatic substitution. Such reactivity patterns are the basis of the synthesis of commercially available derivatives such as formaldehyde condensation oligomers (novolac or novolak resins as known by those skilled in the art) such with the general structure:

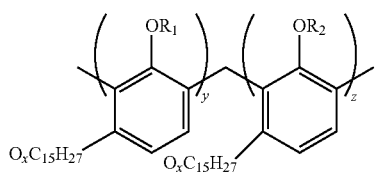

wherein X is 0 or 1 and represents whether or not the aliphatic side chain is epoxidized, y and z represent repeating cardanol units that may have differing functional groups on the aromatic phenol group ($R_1$ and $R_2$). The total number of cardanol units in the oligomer is represented by the sum of y and z and may vary from 1 to 30 in one embodiment, from 1 to 10 in another embodiment, and from 1 to 5 in yet another embodiment. The side chain phenolic groups, $R_1$ and $R_2$, may be independently hydrogen, alkyl or an alkenyl epoxide side chain comprising from 2 to 15 carbons. Alkyl and alkenyl epoxides may comprise straight carbon chains, branched carbon chains, or combinations thereof. Additionally, one skilled in the art would recognize that both alkyl and alkenyl carbon chains may be substituted and may comprise derivatives with at least one of halogen, alkoxy, aryl, and heteroaryl substituents, for example, each of which may be also be substituted. Furthermore, one skilled in the art would also recognize that, as used herein, "substituted" refers to the replacement of hydrogen(s) on the alkyl or alkenyl chain (or any of its substituents) with any other atom or group of atoms including isotopes such as deuterium or tritium.

In one embodiment, the aliphatic side chain may maintain its unsaturation (x=0) or it may be epoxidized (x=1). In the novolac type resins, formaldehyde may serve to connect the cardanol units with methylene ($CH_2$) bridges. Oligomers of cardanol may comprise 2-30 cardanol units (y+z) in one embodiment. The phenolic group of cardanol may be further functionalized, and the formaldehyde oligomer products may incorporate phenols with differing substitution on the phenol ($R_1$ and $R_2$). Although, in this embodiment, two different phenolic substitutions are shown, one of ordinary skill in the art would appreciate that more than two different phenolic substitutions may be incorporated into an oligomer.

In one embodiment, an epoxide may be present in the phenolic substituents $R_1$ and $R_2$. This may be the epoxide of a straight alkenyl chain which may comprise vinyl, propenyl, butenyl, pentenyl, hexenyl, heptenyl, octenyl, nonenyl, decenyl, undecenyl, and dodecenyl side chains. In a particular embodiment the side chain may be the epoxide of a propenyl side chain (a glycidyl ether). While specific embodiments refer to normal straight chain alkenyl side chains, one of ordinary skill in the art would appreciate that epoxides of branched chain alkenyl substitutions on the phenol group may also be possible.

In one embodiment, the lipophilic epoxy modifier may have the structure represented by x=0, y=0, z=1 and $R_1$=glycidyl ether. In such a case the nucleophilic crosslinking partner may require more than one functional amine nucleophile. In another embodiment, the lipophilic epoxy modifier may have the structure represented by x=1, y=0, z=1 and $R_1$=glycidyl ether. In yet another embodiment, the lipophilic epoxy modifier may have the structure represented by x=0, y+z=5, $R_1$=glycidyl ethers of the phenol of cardanols in positions 1, 3 and 5 of the oligomer and $R_2$=hydrogen on the phenol of cardanols in positions 2 and 4 of the oligomer.

In another embodiment, the lipophilic epoxy modifier may be a cardanol derivative with a functionalized aliphatic side chain as represented by the following structure:

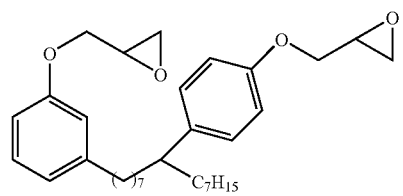

With respect to applications in oil drilling, a lipophilic epoxy modifier may be desirable when used in conjunction with an oil-based mud (OBM). The lipophilic character may lend solubility to the resultant polymer structure in the OBM. As would be obvious to one skilled in the art, the appropriate choice of lipophilic epoxy modifier will depend on the desired properties of the end product polymer. Traits of the polymer that may be of interest include flexibility, rigidity, chemical resistance, heat resistance, impact resistance and ability to create an invert emulsion.

Epoxide Reactive Polymer

In one embodiment, the polymeric material also comprises at least one epoxide reactive polymer that may be chemically altered by the lipophilic epoxy modifier. In general, the epoxide reactive polymer may possess any nucleophilic group that may react to open an epoxide. In a farther embodiment, the epoxide reactive polymer may comprise a polyfunctional molecule with more than one nucleophilic group. In particular embodiments, the nucleophilic groups may comprise amines, alcohols, phenols, thiols, carbanions, and carboxylates.

In one embodiment, the epoxide reactive polymer may comprise phenolic compounds such as lignins, including modified lignins and lignosulfonates, and tannins, including modified tannins and tannic acids, and combinations thereof. In certain embodiments, tannins may be modified to have a higher phenol content. In one embodiment, the phenolic functional group may react with the epoxide-functionalized natural oil under conditions in which the pH ranges from 5-12, from 5-10 in another embodiment, and from 6-9 in yet another embodiment. Reagents which may be used to adjust the pH may include alkali metal hydroxides, such as sodium hydroxide, potassium hydroxide, calcium hydroxide, and rubidium hydroxide, lithium hydroxides, benzyltrimethylammonium hydroxides, and the partially neutralized salts of organic acids, such as tri-sodium ethylenediaminetetraacetic acid. In some embodiments, the alkali metal hydroxide, pH adjusting agent, or buffer, may act as a catalyst, effecting or enhancing the reaction between the lipophilic epoxy modifier and the epoxide reactive polymer.

Some typical well fluid viscosifying additives include "natural" or biopolymers or derivatives thereof, such as, for example, xanthan gum and hydroxyethyl cellulose (HEC) or synthetic polymers and oligomers such as poly(ethylene glycol) (PEG), poly(diallyl amine), poly(acrylamide), poly(aminomethylpropylsulfonate[AMPS]), poly(acrylonitrile), poly (vinyl acetate), poly(vinyl alcohol), poly(vinyl amine), poly (vinyl sulfonate), poly(styryl sulfonate), poly(acrylate), poly (methyl acrylate), poly(methacrylate), poly(methyl methacrylate), poly(vinylpyrrolidone), poly(vinyl lactam) and co-, ter-, and quarter-polymers of the following co-monomers: ethylene, butadiene, isoprene, styrene, divinylbenzene, divinyl amine, 1,4-pentadiene-3-one(divinyl ketone), 1,6-heptadiene-4-one(diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam.

Polymeric Additives

Lignins, tannins, biopolymers, and synthetic polymers, which are typically used as wellbore fluid additives, may be chemically modified via reaction with the lipophilic epoxy modifiers disclosed herein, to provide hydrophobic viscosifiers or loss circulation materials.

Through routine variation of the epoxide reactive polymer, one of skill in the art should recognize the ability of the epoxide reactive polymer to form polymeric additives with varied degrees of hardness and viscosity. In particular, crosslinking and modification of the epoxide reactive polymers may provide materials with varied hardness, hydrophobic character, and ability to swell and viscosify the base oil in which they are used.

As would be obvious to one skilled in the art, the degree of modification/crosslinking may effect the properties of the resultant polymer. One of skill in the art should appreciate that the molar equivalent ratio of the lipophilic epoxy modifier to the selected epoxide reactive polymer (LEM:ERP) will affect the extent of modification/crosslinking achieved. Through routine variation of the molar equivalent ratio LEM: ERP, one of skill in the art should be easily able to determine the proper molar equivalent ratio to obtain a desired viscosity. One of skill in the art should appreciate that a minimally modified/crosslinked polymer with high fluidity (i.e., low viscosity) will be achieved using a high LEM:ERP molar equivalent ratio. In one embodiment, the ratio should be selected so that only partial modification/crosslinking occurs. Lower modification/crosslinking may provide more viscous material appropriate for viscosifier applications. In another embodiment, the ratio may be selected for high modification/crosslinking and may lead to harder structures such as gels that may be appropriate as lost circulation materials.

The ratio of lipophilic epoxy modifier to epoxide reactive polymer may vary. In one embodiment the ratio may range from about 0.02 to 2. In another embodiment, the ratio may range from about 0.02 to 1, and from about 0.2 to 0.8 in yet another embodiment. In one embodiment, more than one lipophilic epoxy modifier and/or more than one epoxide reactive polymer may be used. One of ordinary skill in the art would appreciate that the weight (or molar equivalent) ratio of the lipophilic epoxy modifier to the epoxide reactive polymer will effect the extent of modification/crosslinking. Through routine variation of the quantity of the reacting partners, one skilled in the art should easily be able to determine the proper ratio to obtain a desired viscosity. One skilled in the art would also appreciate that a minimally crosslinked polymer will have high fluidity (low viscosity).

In one embodiment, the mixtures of lipophilic epoxy modifier and epoxide reactive polymer may be heated in a dynamic aging process with a kneader to form the polymeric product. In one embodiment, the temperature may range range from 30 to 250° C. In another embodiment, the temperature may range from 30 to 175° C. In yet another embodiment, the temperature may range from 50 to 100° C.

In one embodiment, the polymer product may have a molecular weight ranging from about 300 to about 2,000,000, from about 500 to about 50,000 in another embodiment, and from about 1000 to about 5,000 in yet another embodiment.

Invert Emulsion Components for Wellbore Fluid Formulations

In one embodiment, polymers described by the procedures above may be included in a wellbore fluid. The wellbore fluids may include an oleaginous continuous phase, a non-oleaginous discontinuous phase, and a lost circulation material and/or a viscosifier. One of ordinary skill in the art would appreciate that the polymer formulations described above may be modified in accordance with the desired application. For example, modifications may include the degree of crosslinking, and/or the nature of the epoxide reactive polymer.

The oleaginous fluid may be a liquid and more preferably is a natural or synthetic oil and more preferably the oleaginous fluid is selected from the group including diesel oil; mineral oil; a synthetic oil, such as such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid. The fluid phase may include either an aqueous fluid or an oleaginous fluid, or mixtures thereof. In a particular embodiment, coated barite or other weighting agents may be included in a wellbore fluid comprising an aqueous fluid that includes at least one of fresh water, sea water, brine, and combinations thereof.

The fluids disclosed herein are especially useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations.

Conventional methods can be used to prepare the drilling fluids disclosed herein in a manner analogous to those normally used, to prepare conventional oil-based drilling fluids. In one embodiment, a desired quantity of oleaginous fluid such as a base oil and a suitable amount of the surfactant described above are mixed together and the remaining components are added sequentially with continuous mixing. An invert emulsion may be formed by vigorously agitating, mixing or shearing the oleaginous fluid and the non-oleaginous fluid.

Other additives that may be included in the wellbore fluids disclosed herein include for example, wetting agents, organophilic clays, viscosifiers, fluid loss control agents, surfactants, dispersants, interfacial tension reducers, pH buffers, mutual solvents, thinners, thinning agents and cleaning agents. The addition of such agents should be well known to one of ordinary skill in the art of formulating drilling fluids and muds.

EXAMPLES

Various polymers were modified with epoxy modifiers in accordance with embodiments of the present disclosure. Specifically, samples of LMW tannins and HMW lignosulphonates were modified with CARDOLITE® NC513, a phenyl glycidyl ether containing an unsaturated $C_{15}$ alkyl group attached to an aromatic ring available from Cardolite Corporation (Newark, N.J.), and HELOXY™ Modifer 8, a $C_{12}$-$C_{14}$ alkyl glycidyl ether, available from Hexion Specialty Chemicals (Houston, Tex.) by mixing the polymers with the epoxy modifiers in the presence of various basic materials. The polymers and modifiers where initially mixed in a beaker with a spatula until homogenous, and then a predetermined amount of base is added dropwise with hand mixing until homogenous. If the samples contained lumps, they should be ground on a pestle and mortar. For Samples 1-4 below, the amount of base necessary to adjust the pH of the samples to a pH of approximately 10 was determined. For Samples 5 and 6, it was expected that the tertiary amine groups would be sufficient to open the ring without alkaline pH.

The samples were then placed in a sealed container and heated to the desired reaction temperature. After reacting for the required amount of time, the samples were removed and reground in a pestle and mortar to ensure homogeneity and no lumps. 5 mg of each sample was added to 100 mL aliquots of a pre-made base fluid comprising 25 g VERSAGEL™ (available from M-I LLC, Houston, Tex.) sheared in 1000 mL of base oil to which 1 mL water is added for yielding of the VERSAGEL™ clay. The samples were then hot rolled at 93° C. for 16 hours, after which the rheological properties and fluid loss were tested. Rheological properties were determined using a Farm Model 35 viscometer, available from Fann Instrument Company. Fluid loss was measured with a saturated API high temperature, high pressure (HTHP) cell. The sample formulations and test results are shown below in Table 1.

TABLE 1

| | Sample Nos. | | | | | | | | | |
|---|---|---|---|---|---|---|---|---|---|---|
| Component | 1 | 2 | 3 | 4 | 5 | 6 | 7 (control) | 8 (control) | 9 (control) | 10 (control) |
| Base Fluid (mL) | 100 | 100 | 100 | 100 | 100 | 100 | 100 | 100 | 100 | 100 |
| Sample | 5 | 5 | 5 | 5 | 5 | 5 | — | — | 5 | 5 |
| Tannin (g) | 10 | 20 | 20 | — | 20 | — | — | — | — | 5 |
| Lignosulphonate (g) | — | — | — | 20 | — | 20 | — | — | 5 | — |
| HELOXY ™ 8 (mL) | 2 | — | — | — | 2 | — | — | — | — | — |
| NC513 (mL) | — | 2 | 2 | 2 | — | 2 | — | — | — | — |
| 50% Caustic | 40 drops | 4 mL | — | — | — | — | — | — | — | — |
| Lime (g) | — | — | 2 | 2 | — | — | — | — | — | — |
| Tripropylamine | — | — | — | — | 2 | 2 | — | — | — | — |
| Amine treated Lignite (VenChem 222) | — | — | — | — | — | — | — | 5 | — | — |
| Heat Treatment | 70° C./ 4 d + 110° C./ 1 d | 110° C. at 16 hrs | 110° C. at 16 hrs | 110° C. at 16 hrs | 110° C. at 6 hrs | 110° C. at 6 hrs | — | — | — | — |
| Fann 35 Rheology | | | | | Rheology at Room Temperature | | | | | |
| 600 rpm | 11 | 25 | 22 | 21 | 15 | 20 | 11 | 10 | 14 | 18 |
| 300 ropm | 7 | 16 | 13 | 12 | 9 | 12 | 8 | 6 | 10 | 11 |
| 6 rpm | 2 | 4 | 3 | 2 | 2 | 2 | 3 | 2 | 4 | 4 |
| 3 rpm | 1 | 3 | 2 | 2 | 2 | 2 | 2 | 1 | 4 | 4 |
| Gel Strength (10 sec/10 min) | 2/— | 5/— | 3/— | 3/— | 3/— | 3/— | 3/— | 1/— | 4/— | 4/— |
| Plastic Viscosity (cps) | 4 | 9 | 9 | 9 | 6 | 8 | 3 | 4 | 4 | 7 |
| Yield Point (lbs/100 sq. ft) | 3 | 7 | 4 | 3 | 3 | 4 | 5 | 2 | 6 | 4 |
| | Volume at 30 mins (93° C. and 500 psi) | | | | | | | | | |
| HTHP Fluid Loss | 6.5 mL | 9.5 mL | 23 mL | 20.5 mL | 15.5 mL | 21 mL | 20 mL in 30 sec | 42 mL | 12.5 mL in 1 min | 16 mL in 1 min |
| Observations | very fine dark material in filtrate | | | | | | No FL control | 15.5 mL in 4 min | No FL control | No FL control |

The results indicate that the properties of the polymers may have been changed by the attempted modification. Further, there is some indication that the type of modifier and base may have some impact on the fluid properties. The fluid loss observed in Sample 1 is low compared to the standard control product VenChem 222 in Sample 8, and is also much better than the unmodified base polymer in Sample 10. The viscosity of sample 2 was shown to increase by the addition of the modified tannin, while the sample also shows good fluid loss as compared to the samples.

Advantages of the current invention include enhanced rheological properties of the fluids that incorporate the viscosifiers described herein. These properties may include the yield point and the plastic viscosity. Additionally, the incorporation of highly lipophilic epoxy modifier element in the polymer structure of viscosifiers and/or loss circulation materials should yield products that are compatible for use with oil-based mud drilling fluids. Such agents may also increase lubricity and diminish wear of the drilling equipment.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A wellbore fluid comprising:
   an oleaginous continuous phase;
   a non-oleaginous phase; and
   a polymeric additive formed by reaction of at least one lipophilic epoxy modifier and at least one epoxide-reactive agent,
      wherein the at least one epoxide-reactive agent comprises at least one selected from lignins, tannins, biopolymers, starches, carboxy methyl cellulose, polyacrylates, polyacrylamides, and synthetic polymers.

2. The wellbore fluid of claim 1, wherein the lipophilic epoxy modifier comprises an epoxide-functionalized derivative of a natural oil.

3. The wellbore fluid of claim 2, wherein the epoxide-functionalized derivative of the natural oil comprises at least one selected from soybean oil, linseed oil, rapeseed oil, cashew nut shell oil, perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil.

4. The wellbore fluid of claim 2, wherein the epoxide-functionalized derivative of the natural oil comprises derivatives cashew nut shell oil with formula:

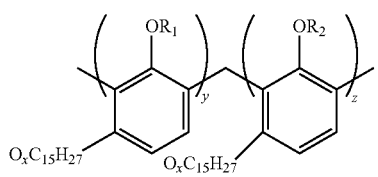

wherein x is an integer selected from 0 to 1;
   wherein y is an integer selected from 0 to 5;
   wherein z is an integer selected from 1 to 5;
   wherein $R_1$ is selected from H, alkyl, alkenyl epoxide, and derivatives thereof; and
   wherein $R_2$ is selected from H, alkyl, alkenyl epoxide, and derivatives thereof.

5. The wellbore fluid of claim 1, wherein the lipophilic epoxy modifier comprises a compound with the formula:

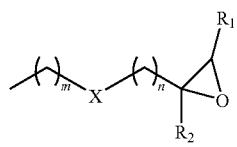

wherein X may be S, NH, O, or $CH_2$; n may range from 0 to 20; m may range from 0 to 20;
   and $R_1$ and $R_2$ may each be independently selected from H and alkyl groups having 1 to 4 carbon atoms.

6. The wellbore fluid of claim 1, wherein a weight ratio of the lipophilic epoxy modifier to the epoxide-reactive agent is a range from about 0.05 to 1.

7. The wellbore fluid of claim 1, wherein the oleaginous fluid is selected from diesel oil, mineral oil, synthetic oil, ester oil, glycerides of fatty acids, aliphatic esters, aliphatic ethers, aliphatic acetals, and combinations thereof.

8. The wellbore fluid of claim 1, wherein the non-oleaginous phase is selected from fresh water, sea water, brine, aqueous solutions containing water soluble organic salts, water soluble alcohols, water soluble glycols, and combinations thereof.

9. A method of drilling a subterranean hole with an invert emulsion drilling fluid comprising:
   mixing an oleaginous fluid, a non-oleaginous fluid, and a polymeric additive;
      wherein the polymeric additive is formed by mixing at least one lipophilic epoxy modifier and at least one epoxide-reactive agent; and
      wherein the at least one epoxide-reactive agent comprises at least one selected from lignins, tannins, biopolymers, starches, carboxy methyl cellulose, polyacrylates, polyacrylamides, and synthetic polymers; and
   drilling said subterranean hole using said invert emulsion as the drilling fluid.

10. The method of claim 9, wherein the lipophilic epoxy modifier a compound with the formula:

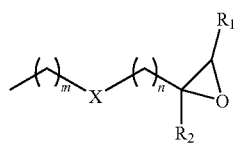

wherein X may be S, NH, O, or $CH_2$; n may range from 0 to 20; m may range from 0 to 20;
   and $R_1$ and $R_2$ may each be independently selected from H and alkyl groups having 1 to 4 carbon atoms.

11. The method of claim 9, wherein the at least one lipophilic epoxy modifier comprises an epoxide-functionalized derivative of at least one selected from soybean oil, linseed oil, rapeseed oil, cashew nut shell oil, perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil.

12. The method of claim 11, wherein the at least one lipophilic epoxy modifier comprises derivatives of the extracts of cashew nut oil comprising structures with formula:

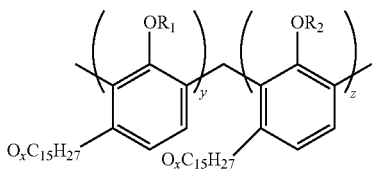

wherein x is an integer selected from 0 to 1;
wherein y is an integer selected from 0 to 5;
wherein z is an integer selected from 1 to 5;
wherein $R_1$ is selected from H, alkyl, alkenyl epoxide, and derivatives thereof; and
wherein $R_2$ is selected from H, alkyl, alkenyl epoxide, and derivatives thereof.

13. The method of claim 9, wherein a weight ratio of the lipophilic epoxy modifier to the epoxide-reactive agent is a range from about 0.05 to 1.

14. The method of claim 9, wherein the oleaginous fluid is selected from diesel oil, mineral oil, synthetic oil, ester oil, glycerides of fatty acids, aliphatic esters, aliphatic ethers, aliphatic acetals, and combinations thereof.

15. The method of claim 9, wherein the non-oleaginous phase is selected from fresh water, sea water, brine, aqueous solutions containing water soluble organic salts, water soluble alcohols, water soluble glycols, and combinations thereof.

16. A wellbore fluid additive comprising:
a polymer formed by reaction of at least one lipophilic epoxy modifier and at least one epoxide-reactive agent;
wherein the at least one epoxide-reactive agent is at least one selected from lignins, tannins, biopolymers, starches, carboxy methyl cellulose, polyacrylates, polyacrylamides, and synthetic polymers.

17. The wellbore fluid additive of claim 16, wherein the at least one lipophilic epoxy modifier comprises an epoxide-functionalized derivative of a natural oil.

18. The wellbore fluid additive of claim 17, wherein the epoxide-functionalized derivative of the natural oil is at least one selected from soybean oil, linseed oil, rapeseed oil, cashew nut shell oil, perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil.

19. The wellbore fluid additive of claim 18, wherein the epoxide-functionalized derivative of the natural oil comprises derivatives cashew nut shell oil with formula:

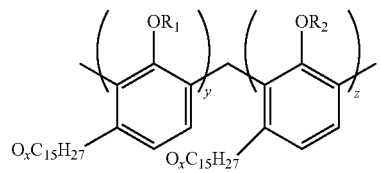

wherein x is an integer selected from 0 to 1;
wherein y is an integer selected from 0 to 5;
wherein z is an integer selected from 1 to 5;
wherein $R_1$ is selected from H, alkyl, alkenyl epoxide, and derivatives thereof; and
wherein $R_2$ is selected from H, alkyl, alkenyl epoxide, and derivatives thereof.

20. The wellbore fluid additive of claim 16, wherein the lipophilic epoxy modifier a compound with the formula:

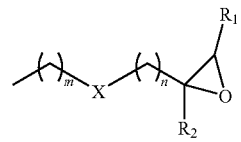

wherein X may be S, NH, O, or $CH_2$; n may range from 0 to 20; m may range from 0 to 20;
and $R_1$ and $R_2$ may each be independently selected from H and alkyl groups having 1 to 4 carbon atoms.

21. The wellbore fluid additive of claim 16, wherein a weight ratio of the lipophilic epoxy modifier to the epoxide-reactive agent is a range from about 0.05 to 1.

* * * * *